United States Patent [19]

Baron

[11] 4,076,649

[45] Feb. 28, 1978

[54] PRODUCTION OF N-ALKYLATED AMINES AND CATALYST THEREFOR

[75] Inventor: Seymour Baron, Wayne, N.J.

[73] Assignee: Hexcel Corporation, Dublin, Calif.

[21] Appl. No.: 673,142

[22] Filed: Apr. 2, 1976

[51] Int. Cl.$^2$ .................. B01J 27/02; C01B 17/96; C07C 87/00

[52] U.S. Cl. .................. 252/440; 423/533; 423/538; 423/544; 260/583 R

[58] Field of Search .................. 252/440; 260/583 R; 423/533, 538, 544

[56] References Cited

U.S. PATENT DOCUMENTS

| Re. 18,380 | 3/1932 | Jaeger | 423/533 X |
|---|---|---|---|
| 1,657,753 | 1/1928 | Jaeger et al. | 423/538 X |
| 2,113,241 | 4/1938 | Punnett | 260/585 B X |
| 3,732,311 | 5/1973 | Baron | 260/583 R |
| 3,885,020 | 5/1975 | Whelan | 423/538 X |
| 3,939,250 | 2/1976 | Michel et al. | 423/244 X |

FOREIGN PATENT DOCUMENTS

| 2,168,716 | 8/1973 | France. |
| 410,500 | 5/1934 | United Kingdom. |

*Primary Examiner*—Patrick P. Garvin
*Assistant Examiner*—William G. Wright
*Attorney, Agent, or Firm*—Jacobs & Jacobs

[57] ABSTRACT

An improved supported thorium sulfate catalyst is prepared by converting a thorium compound impregnated in the carrier to thorium sulfate in situ. The improved catalyst is used in the production of N-alkylated amines, by contacting an alkanol with a primary or secondary amine, in the vapor phase.

4 Claims, No Drawings

PRODUCTION OF N-ALKYLATED AMINES AND CATALYST THEREFOR

The present invention relates to an improved thorium sulfate catalyst suitable for use in the production of N-alkylated amines.

U.S. Pat. No. 3,732,311 describes the reaction of alcohols and amines over a thorium sulfate catalyst to produce N-alkylated amines. This process is particularly desirable due to the high yields obtained by reaction of a higher alkanol with a secondary amine to produce tertiary amines. In Example 1 of the patent, dodecyl alcohol is reacted with dimethyl amine over the thorium sulfate catalyst to give 95% dodecyl-dimethylamine and 5% dodecene.

While this process has excellent potential as a commercial route to N-alkylated amines, especially tertiary alkyl amines wherein at least one alkyl is of 8 to 18 carbon atoms, nevertheless the yield of desired product often varies from run to run as regards conversion, selectivity and throughput. It has now been found that this lack of reproducibility is in large measure due to the manner by which the thorium sulfate is prepared. Thus, U.S. Pat. No. 3,732,311 discloses that the thorium sulfate catalyst is formed by depositing thorium sulfate on a carrier, but this simple method of forming the catalyst results in differences in catalytic activity of the catalyst, even though the physical and chemical characteristics of the catalyst appear to be essentially identical from batch to batch.

It is therefore an object of this invention to provide a process of preparing an improved supported thorium sulfate catalyst.

It is another object of this invention to provide an improved process for producing N-alkylated amines.

These and other objects are fulfilled by the present invention, which provides a process for preparing a supported thorium catalyst, which comprises impregnating a porous carrier with a thorium compound and converting the thorium compound to thorium sulfate, in situ.

The present invention also provides a process for production of N-alkylated amines by vapor phase reaction of an alkanol with a primary or secondary amine, at a temperature of between about 200° and about 500° C, over the improved supported thorium sulfate catalyst of the invention.

The first step in the production of the improved thorium sulfate catalyst is impregnation of an inert carrier with a thorium compound. The most convenient way to carry this out is to use for the impregnation an aqueous solution of a watersoluble thorium compound, such as a thorium halide or thorium nitrate. Water is attractive for use as the solvent due to its low cost and ease of removal from the impregnated carrier, but other solvents, such as organic solvents, e.g. lower alkanols, preferably ethanol, can be used. Most preferably, an aqueous solution of thorium nitrate will be used because of ready availability and lower cost of the materials.

The concentration of the thorium compound in the solvent is not critical, but since the solvent has to be evaporated during impregnation, clearly the economics favor using as high a concentration as possible. An amount of the solution must be used so as to deposit sufficient thorium compound on the carrier to give rise to sufficient thorium sulfate, but the optimum amounts will be determined empirically.

Removal of the solvent from the impregnated carrier is readily effected by any suitable means, such as a rotary evaporator, a tray drier or the like. Care should be exercised during the evaporation not to decompose the thorium compound by exposure thereof to excessive temperatures, but this may be accomplished by use of vacuum drying equipment.

After impregnation, the thorium compound is converted to thorium sulfate in situ. Thorium salts, such as thorium nitrate, are converted to thorium sulfate by reaction with sulfuric acid. Alternatively, the thorium compound can be converted to thorium oxide, which is then reacted with sulfur trioxide to form thorium sulfate. For example, thorium nitrate deposited on the carrier is readily converted to thorium oxide merely by heating above about 150° C., such as about 215° C.

If sulfuric acid is used, it is preferably diluted with water or a suitable organic solvent, such as an alkanol, e.g. methyl alcohol, a ketone, e.g. methylethylketone, an acetate, e.g. ethyl acetate, or the like, to avoid contact of the thorium compound and carrier with concentrated sulfuric acid. If a water-soluble thorium compound was used to impregnate the carrier, the use of a dilute aqueous sulfuric acid reaction system should be avoided, since part of the thorium compound would then be leached out of the carrier by the aqueous media. For reaction with water-soluble thorium compounds, such as thorium halides and thorium nitrate, it is preferred to employ a solution of concentrated sulfuric acid in an organic solvent. Commercial concentrated sulfuric acid is about 95% sulfuric acid, and this gives good results. In general, sulfuric acid of at least about 60% concentration, preferably at least about 80% concentration, diluted with from about 1 to about 20, preferably about 5 to about 15 volumes of the organic solvent per volume of acid, may be used to advantage.

The conversion of the thorium compound to thorium sulfate should be carried to completion, and an excess over the stoichiometric amount of the sulfating reactant should be used. For example, there should be more than about 2 mols of sulfuric acid or sulfur trioxide per mol of thorium in the thorium compound, preferably from about 2.5 to about 3 mols per mol of thorium. Sufficient time should be allowed for the reaction to go to completion, and this will be determined empirically.

Any carrier that is inert to the alkylation reaction and that will support the thorium sulfate at the alkylation reaction temperatures may be used. Pumice is a preferred carrier due to its availability and cost, but other inert carriers may be used, such as spinel, ceramic material in honeycomb form made from alumina, porous glass ceramic material, silica, alumina and the like. The carrier is preferably washed, as with acid and/or water, to remove impurities prior to impregnation.

The improved catalyst of the invention may be used in a fixed or fluidized bed reactor for vapor phase reaction between an alkanol, e.g. $C_2-C_{18}$ alkanol, and a primary or secondary amine at a temperature of from about 200° to about 500° C. This process finds its highest utility in the production of amines of the formula:

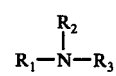

by reaction of the alcohol $R_3OH$ and amine $HNR_1R_2$, wherein $R_1$ and $R_2$ are lower alkyl, e.g. of 1 to 7 carbon atoms, and $R_3$ is higher alkyl, e.g. of 8 to 18 carbon atoms, and most particularly wherein $R_3$ is alkyl of 12 to 16 carbon atoms and $R_1$ and $R_2$ is alkyl of 1 or 2 carbon atoms. Reaction of a higher alkanol and a secondary amine is normally difficult to carry out with high conversion, high selectivity and high throughput, but the improved catalyst of the invention makes this possible.

Specifically, the process of the present invention enables the realization of conversions approaching 100%, such as from about 90 to about 99.7%, and selectivities approaching about 98, such as about 90 to about 98% at a space velocity in the preferred range of from about 5 to 20 pounds/cu. ft. hour. If desired, the space velocity can be higher or lower than the preferred range. These terms are used herein as follows:

$$\text{Conversion} = \frac{\text{wt. Alkanol}_i - \text{wt. alkanol}_f \times 100}{\text{wt. Alkanol}_i}$$

$$\text{Selectivity} = \frac{\text{wt. Desired Amine formed}}{\text{wt. Alkanol}_i - \text{wt. Alkanol}_f} \times 100$$

where "$i$" represents the weight charged to the reactor and "$f$" the weight remaining at the end of the reaction.

$$\text{Space Velocity} = \frac{\text{Flow Rate Of Reactants (lb./hour)}}{\text{Volume Of Catalyst Bed (cu. ft.)}}$$

The present invention is illustrated by the following Examples. In the specification herein and in the appended claims, all parts and proportions are by weight except as otherwise stated.

EXAMPLE 1

Pumice was washed with nitric acid to remove impurities and water-washed to remove residual nitric acid. An 800g portion of the purified pumice (4–8 mesh) was slurried with a solution of 320g Th(NO$_3$)$_4$.4H$_2$O (0.58 mol) in 800 ml distilled water and evaporated to dryness in a rotary vacuum evaporator maintained at 75°–80° C and 50-100 mm Hg. After the drying step, the carrier impregnated with thorium nitrate was soaked overnight in a mixture of 180g (99 ml) of 95% H$_2$SO$_4$ (1.74 mol) and 2000 ml of methanol. The slurry was then filtered and washed with methanol until acid-free.

Visual inspection of the catalyst showed a uniform coating of thorium sulfate, as compared to the mottled appearance of the thorium sulfate catalyst prepared by impregnating pumice with thorium sulfate as taught in U.S. Pat. No. 3,732,311.

EXAMPLE 2

A 36 inch × 2 inch diameter Pyrex tube is charged with sufficient catalyst prepared according to Example 1 to provide a catalyst bed 10 inches in length. A thermocouple is placed in the middle of the bed. The tube is then heated in a combustion furnace to 340° C. and air is allowed to flow through the tube at about 1 cubic foot/hour for 2 hours, after which time the temperature of the bed is brought to the desired reaction temperature and 7 mmol of dodecyl alcohol and 14 mmol dimethylamine are simultaneously passed through the tube. The product is collected and analyzed by gas liquid chromatography. The results are reported below for three runs. Selectivity is calculated on the basis of formation of dimethyldodecylamine.

| | Production of Methyldodecylamine | | | |
|---|---|---|---|---|
| Runs | Reaction Temperature (° C.) | Space Velocity of Reactants (lbs./cu.ft./hr.) | COnversion (%) | Selectivity (%) |
| 1 | 320 | 13.8 | 98.3 | 96 |
| 2 | 320 | 13.8 | 99.0 | 97.1 |
| 3 | 340 | 13.8 | 99.1 | 92 |

Runs 1 and 2 employed two different batches of catalyst, and yet the results obtained were consistent as regards conversion and selectively at a given throughput. Runs 1 and 2 are representative of the consistency of results obtained from batch to batch of catalyst over a large number of runs.

Run 3 employed the same batch of catalyst as Run 1 and illustrates that selectivity is a function of temperature as well as conversion.

What is claimed is:

1. A process for preparing a catalyst comprising an inert carrier impregnated with thorium sulfate, which comprises contacting said inert carrier with an aqueous solution of thorium nitrate to impregnate the inert carrier with thorium nitrate, heating the thus impregnated carrier to a temperature above about 150° C. for a time sufficient to allow said thorium nitrate to be converted to thorium oxide, and reacting said thorium oxide with sulfur trioxide to convert the thorium oxide to thorium sulfate.

2. A process for preparing a catalyst comprising an inert carrier impregnated with thorium sulfate, which comprises contacting the inert carrier with an aqueous solution of thorium nitrate to impregnate the inert carrier with thorium nitrate, heating the carrier to a temperature below the decomposition temperature of thorium nitrate to remove water therefrom, and converting the thorium nitrate to thorium sulfate by contacting the carrier impregnated with thorium nitrate with a mixture of concentrated sulfuric acid and an organic solvent, the ratio by volume of sulfuric acid to organic solvent being in the range of from about 5:1 to about 20:1.

3. The process according to claim 2, wherein the carrier is pumice.

4. The process according to claim 2, wherein the organic solvent is methanol.

* * * * *